(12) United States Patent
Pettinaroli et al.

(10) Patent No.: US 8,985,140 B2
(45) Date of Patent: Mar. 24, 2015

(54) AUTOMATIC BALANCING VALVE

(75) Inventors: Giulio Pettinaroli, San Maurizio d'Opaglio (IT); Liborio Spagnolo, San Maurizio d'Opaglio (IT)

(73) Assignee: Fratelli Pettinaroli S.p.A, San Maurizio d'Opaglio (IT)

( * ) Notice: Subject to any disclaimer, the term of this patent is extended or adjusted under 35 U.S.C. 154(b) by 545 days.

(21) Appl. No.: 13/501,016

(22) PCT Filed: Sep. 22, 2010

(86) PCT No.: PCT/IB2010/002370
§ 371 (c)(1),
(2), (4) Date: Jun. 26, 2012

(87) PCT Pub. No.: WO2011/045639
PCT Pub. Date: Apr. 21, 2011

(65) Prior Publication Data
US 2012/0325338 A1  Dec. 27, 2012

(30) Foreign Application Priority Data

Oct. 13, 2009 (IT) .............................. MI20090324 U

(51) Int. Cl.
*F24D 19/10* (2006.01)
*G05D 7/01* (2006.01)

(52) U.S. Cl.
CPC ........ *F24D 19/1015* (2013.01); *F24D 19/1036* (2013.01); *G05D 7/0113* (2013.01)
USPC ............ 137/487; 137/495; 137/613; 251/208

(58) Field of Classification Search
USPC ................... 137/487, 495, 613; 251/205, 208
See application file for complete search history.

(56) References Cited

U.S. PATENT DOCUMENTS

| | | | | |
|---|---|---|---|---|
| 2,951,501 A * | 9/1960 | Thylefors | ...................... | 251/207 |
| 3,100,620 A * | 8/1963 | Kates | ............................. | 251/208 |
| 4,000,754 A * | 1/1977 | Risk | ............................... | 137/487 |
| 4,611,628 A * | 9/1986 | Pasternack | .................... | 137/613 |
| 6,572,077 B1 * | 6/2003 | Worner | .................... | 251/129.18 |
| 7,967,023 B2 * | 6/2011 | Jorgensen | .................... | 137/201 |
| 8,418,716 B2 * | 4/2013 | Huang | ........................... | 137/613 |
| 8,469,052 B2 * | 6/2013 | Jorgensen | .................... | 137/495 |
| 8,695,629 B2 * | 4/2014 | Hsiao | ........................... | 137/495 |
| 2006/0060251 A1 * | 3/2006 | Gamard et al. | ............... | 137/613 |

FOREIGN PATENT DOCUMENTS

| | | |
|---|---|---|
| DE | 198 26 076 | 8/1999 |
| EP | 0 683 444 | 11/1995 |
| EP | 1 150 194 | 10/2001 |

OTHER PUBLICATIONS

Notification of Transmittal and International Search Report and Written Opinion of the International Searching Authority, for PCT/IB2010/002370, mailed Apr. 5, 2012, 10 pages.
Notification Concerning Transmittal International Preliminary Report on Patentability and Written Opinion of the International Searching Authority for PCT/IB2010/002370, issued May 1, 2012, 6 pages.

* cited by examiner

*Primary Examiner* — Eric Keasel
(74) *Attorney, Agent, or Firm* — Nixon & Vanderhye P.C.

(57) ABSTRACT

An automatic balancing valve is disclosed which is equipped with choking means that can be operated manually with a ring nut placed below the actuating member of the shutter and aligned axially therewith. Advantageously, the dimensions of the ring nut are larger in plan view compared to the plan view dimensions of the actuating member so as to allow its rotation without removing the actuating member.

9 Claims, 3 Drawing Sheets

AUTOMATIC BALANCING VALVE

This application is the U.S. national phase of International Application No. PCT/IB2010/002370 filed 22 Sep. 2010 which designated the U.S. and claims priority to IT MI2009U000324 filed 13 Oct. 2009, the entire contents of each of which are hereby incorporated by reference.

TECHNICAL FIELD OF THE INVENTION

The present invention relates to an automatic balancing valve, such as a valve that can be installed in heating and/or cooling systems made up of several distinct sections, to properly adjust the supply of thermo-convective fluid flow to each section of the system.

PRIOR ART

In general, in hydraulic systems consisting of multiple sections, the fluid flow rates in each section are established during design stage but may also vary during operation.

For example, referring specifically to heating and/or cooling systems in places such as schools, hospitals, hotels, shopping centers and the like, the variation in the different flow rates as referred to the design data would inevitably lead to temperature differences in the different places which, apart from giving rise to physical discomfort, entail an increase in energy consumption.

Balancing valves typically include a valve body having an inlet opening and an outlet opening. The fluid flow in the valve is adjusted by a movable shutter controlled by an actuating member.

The balancing valve is also provided with adjustment means that automatically keep the fluid flow rate constant in the valve as the pressure difference between the inlet opening and outlet opening changes. Along the passage of the fluid inside the valve there are also choking means which allow a maximum flow rate value to be set through the valve. Basically, after installing the valve and setting the correct flow rate determined during design stage, the adjustment means operate continuously to hold the differential pressure upstream and downstream of the valve constant, thus keeping the flow rate constant through the valve.

The shutter is also operated to adjust the valve flow rate by means of a manual actuating member or, alternatively, by an actuator member controlled by a signal sent from a control device of the whole system.

When the system is in operation, it may often be necessary to operate the choking means, for example to better adjust the maximum flow rate as compared to that initially determined during the design stage. The actual pressure losses along the various sections of the system can actually differ from those calculated theoretically, not only in the system starting up phase but also following the variations that subsequently occur when the system is in operation, for instance after closure or reduced use of one or more sections of the system.

With known balancing valves, the adjustment of the maximum flow rate is performed manually, for instance operating an external control such as a ring nut, a lever and the like.

This operation can often be difficult and takes a rather long time to perform, especially when the valves are installed in inaccessible places, or if the external control itself is hard to reach due to the size of the valve body or the actuating member of the shutter if the valve is installed with unfavorable orientation in positions difficult to reach, for instance when accessing through ceilings or false ceilings.

In some known valves the control used to adjust the maximum flow rate is hidden under the actuating member of the shutter. In order to adjust the maximum flow rate through the valve it may be necessary to temporarily remove the actuating member of the shutter, whether it is of the manual or controlled type, and then install it again after performing the adjustment.

In other known valves the adjustment of the maximum flow rate can be performed by operating a control located on the opposite side of the shutter actuating member: this allows to avoid removing the actuating member, although the adjustment can be difficult if the control is facing the inside of the space occupied by the valve, as it normally occurs to make instead access to the shutter actuating member easier.

In consideration of the foregoing, one of the objects of the present invention is to propose an automatic balancing valve which allows to simplify and make operations easier when setting up and/or changing the maximum flow rate through the same valve.

Another object of the present invention is to propose an automatic balancing valve which allows to give a clear and easily visible indication of the set flow rate value.

SUMMARY OF THE INVENTION

These objects are achieved by the invention by using a balancing valve according to claim 1. Additional features and advantages of the present invention are set forth in the relevant dependent claims.

In the valve according to the invention the choking means are operated manually with a ring nut placed below the shutter actuating member and axially aligned with the same actuating member. Advantageously, the dimensions of the ring nut are larger in the plan view compared to the plan view dimensions of the actuating member so as to allow its rotation without removing the actuating member.

Therefore it will be particularly easy to operate the ring nut and adjust the choking means which determine the maximum flow rate, regardless of the position and orientation of the installed valve.

In a preferred embodiment of the valve according to the invention, there is a percentage scale shown on the ring nut and at least one reference element to indicate the percentage value selected according to the ring nut position.

The reference element is preferably a portion of a locking element of the ring nut. In particular, the locking element can move between a first position in which the rotation of the ring nut is enabled and a second position in which the rotation of the ring nut is prevented.

BRIEF DESCRIPTION OF THE DRAWINGS

Additional features and advantages of the present invention will become more apparent from the following description, given only as an illustrative and not limitative example with reference to the attached drawings, wherein.

DETAILED DESCRIPTION OF THE INVENTION

Figure 1:
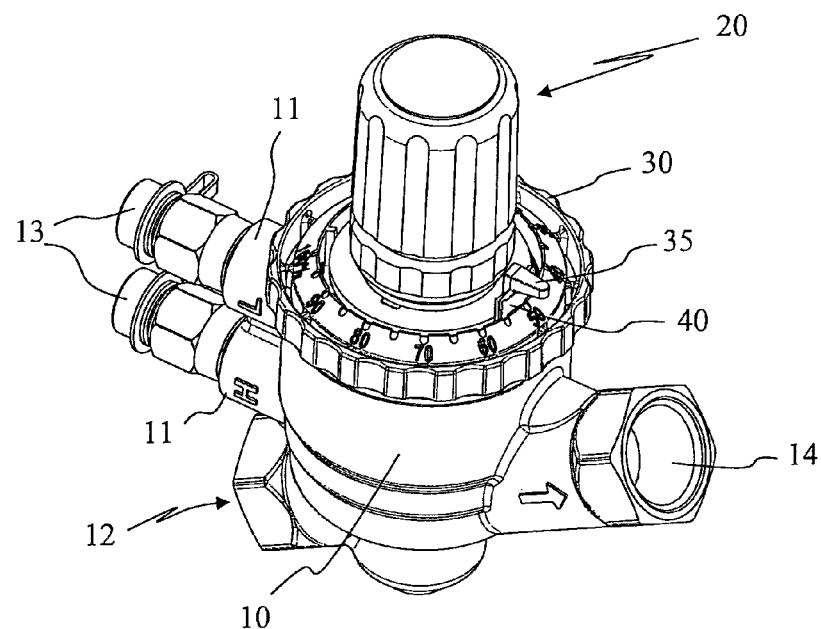
FIG. 1 is a perspective view of a possible embodiment of a balancing valve according to the present invention.
Figure 2:
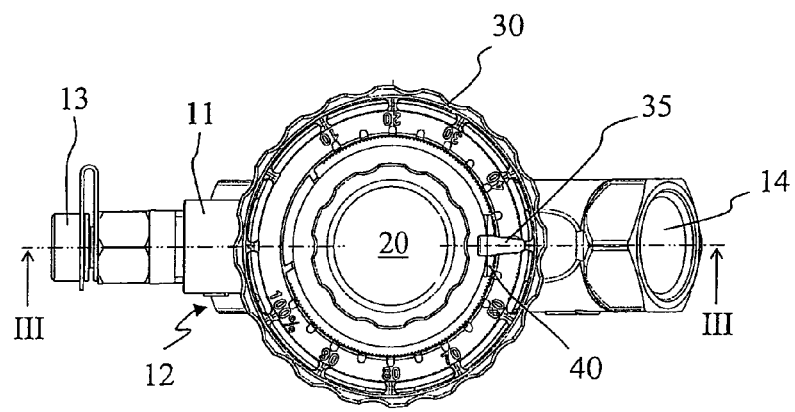
FIG. 2 is a top plan view of the balancing valve represented in FIG. 1.
Figure 3:
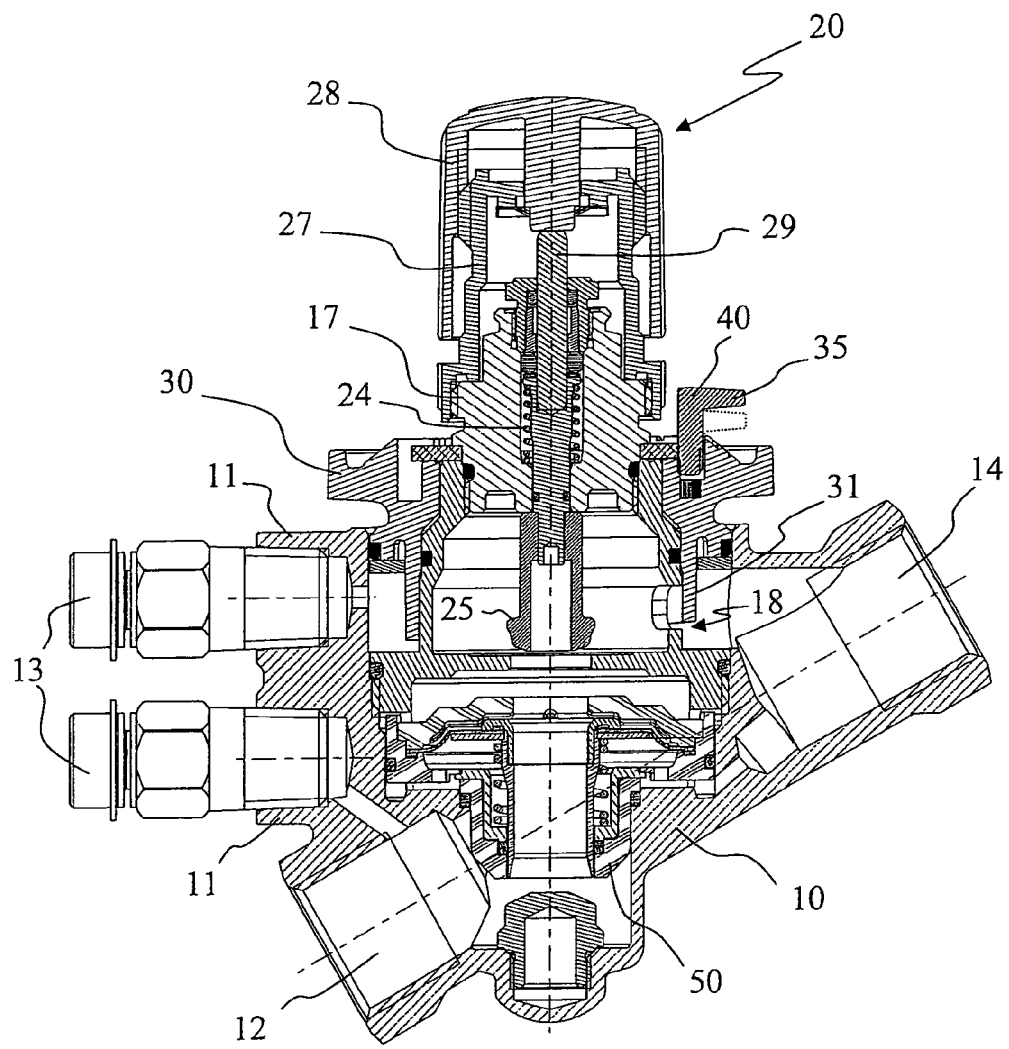
FIG. 3 is a longitudinal section view of the valve according to plane III-III of FIG. 2.

Referring initially to the embodiment illustrated in FIGS. 1 to 3, a balancing valve according to the invention comprises a valve body 10 having an inlet opening 12 and an outlet opening 14.

On the inlet opening side 12 are also two connectors 11, closed with their respective plugs 13, which allow to temporarily connect probes that can detect the pressure and/or flow values of the valve installed. These values are generally transferred to a measuring instrument to determine the operating features of the system section in which the valve is installed and the proper operation of the valve thereof.

In the embodiment shown here, there is a manual actuating member 20 for the shutter and a ring nut 30 placed below the actuating member 20 and aligned axially therewith.

As is evident from the view in FIG. 2, the dimensions of the ring nut 30 are larger in the plan view compared to the plan view dimensions of the actuating member 20. The ring nut 30, which is the control used for the choking means, can thus be easily rotated without removing the actuating member 20.

The ring nut 30 preferably comprises a percentage scale which falls, for example, within a range from 10% to 100%. The valve also comprises a reference element 35 which allows to provide an indication of the maximum set flow rate by rotating the ring nut 30. As better shown in FIG. 3, the reference element 35 constitutes a portion of a locking element 40 which is made movable between a first position (solid line in FIG. 3) in which the rotation of the ring nut 30 is enabled, and a second position (broken line in FIG. 3) in which the rotation of the ring nut 30 is prevented.

The rotation of the ring nut 30 moves a chocking wall 31 appropriately shaped so as to obstruct, to a proportional degree, the opening 18 through which the fluid comes out from the chamber in which the shutter 25 is located. As better shown in FIG. 5, the chocking wall 31 is essentially inclined at the scale values from approximately 10% to 90%, while at the value corresponding to 100% of the maximum flow rate on the ring nut 30, there is a completely open window 32.

In the embodiment illustrated in FIG. 3, the shutter 25 is moved manually in an axial direction through the actuating member 20. The latter includes a bushing 27 with an internal thread which is screw-engaged with a threaded portion 17 of the valve body 10. A knob 28 is then placed onto the bushing 27 by screw-engaging it with corresponding threads.

Screwing and unscrewing the knob 28 will act upon the end portion of a thrust pin 29, which protrudes toward the outer side of the valve; whereas the opposite end of the pin 29 is mechanically connected to the shutter 25. When the knob 28 is screwed, the pin 29 pushes the shutter 25 downwards; when the knob 28 is unscrewed, a return spring 24 will move the shutter 25 back up as well as the pin 29, simultaneously.

Inside the balancing valve are also adjustment means 50 used to automatically change the flow of the fluid in the valve according to the pressure difference between the inlet opening 12 and outlet opening 14.

Figure 4:
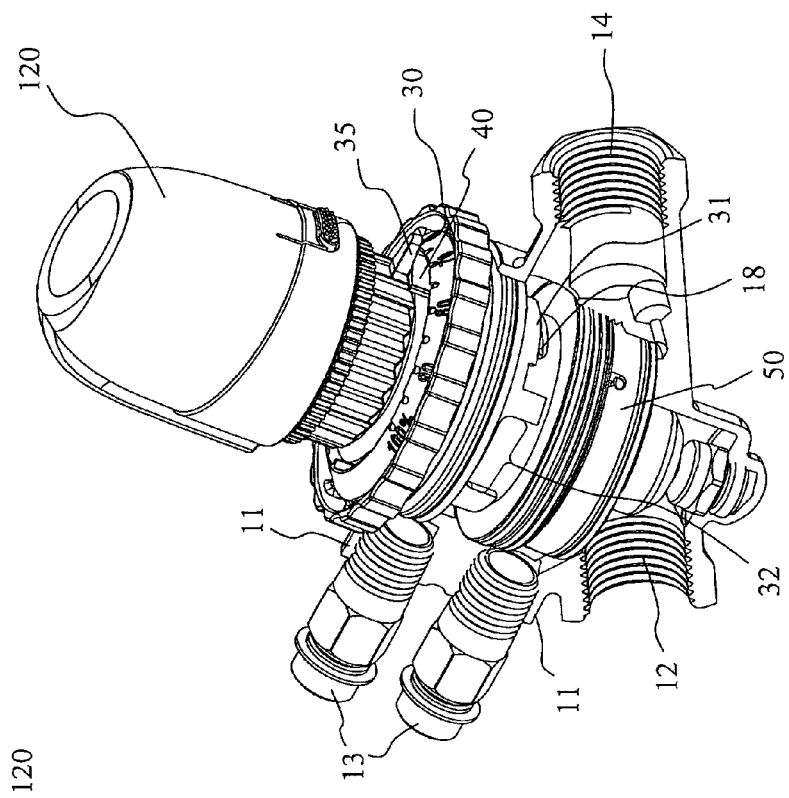
FIG. 4 is a perspective view, in a partially disassembled condition, of another embodiment of a balancing valve according to the present invention.
Figure 5:
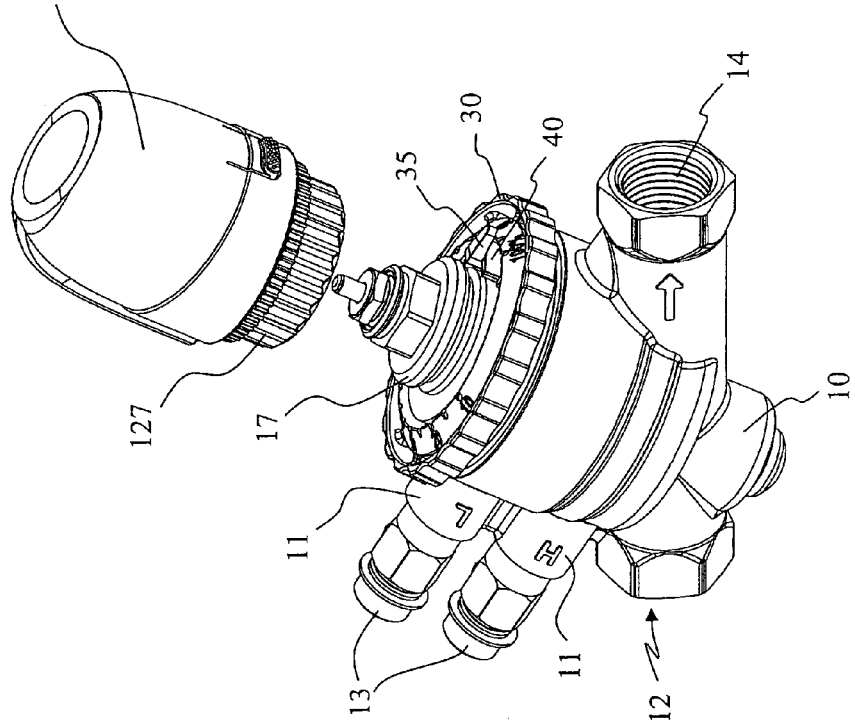
FIG. 5 is a perspective view, in a partial section view, of the valve in FIG. 4 in the assembled condition.

FIGS. 4 and 5 show another embodiment of the valve according to the invention, in which the actuating member of the shutter 25 is a power-assisted actuating member 120, such as a wax bulb or an electric motor, able to apply thrust on the pin 29.

The power-assisted actuating member 120 comprises an assembly portion 127 which includes, for example, an internal thread (not shown) which is engaged on the threaded portion 17 of the valve body 10, i.e. the same threaded portion on which the bushing 27 of the manual actuating member 20 is installed.

The invention claimed is:

1. An automatic balancing valve comprising a valve body having an inlet opening and an outlet opening, at least one shutter that can be moved axially under the force applied by an actuating member, adjustment means to automatically change the fluid flow rate in the valve according to the pressure difference between said inlet opening and said outlet opening and chocking means to set a maximum flow rate through said valve, said chocking means being operated manually through a ring nut placed below said actuating member and aligned axially therewith, characterized in that the dimensions of said ring nut are larger in the plan view compared to the plan view dimensions of said actuating member so as to allow the rotation of said ring nut without removing said actuating member.

2. The valve according to claim 1, wherein a percentage scale is shown on said ring nut and in which at least one reference element is used to indicate the percentage value selected according to the position of said ring nut.

3. The valve according to claim 2, wherein said reference element is a portion of said locking element.

4. The valve according to claim 1, wherein at least one locking element is provided which is movable between a first position in which the rotation of said ring nut is enabled and a second position in which the rotation of said ring nut is prevented.

5. The valve according to claim 1, wherein the actuating member of said shutter is a manual actuating member.

6. The valve according to claim 5, wherein said manual actuating member includes at least one internally-threaded bushing to be installed on the valve body and a knob having an internal threaded portion to be screw-engaged onto the external thread of said bushing.

7. The valve according to claim 1, wherein the actuating member of said shutter is a power-assisted actuating member.

8. The valve according to claim 7, wherein said power-assisted actuating member includes a wax bulb.

9. The valve according to claim 7, wherein said power-assisted actuating member includes an electric motor.

* * * * *